US012784142B2

(12) United States Patent
Liu et al.

(10) Patent No.: US 12,784,142 B2
(45) Date of Patent: Nov. 3, 2026

(54) INTERFERENCE CANCELLATION IN IMAGING FOR CONSTELLATION TRACKING

(71) Applicant: Microsoft Technology Licensing, LLC, Redmond, WA (US)

(72) Inventors: Ping Liu, Bothell, WA (US); Alfonsus Dibianto Lunardhi, San Ramon, CA (US); Sean Patrick Dever, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 18/744,239

(22) Filed: Jun. 14, 2024

(65) Prior Publication Data

US 2025/0384523 A1 Dec. 18, 2025

(51) Int. Cl.
*G06T 5/50* (2006.01)
*H04N 19/169* (2014.01)

(52) U.S. Cl.
CPC ............. *G06T 5/50* (2013.01); *H04N 19/169* (2014.11); *G06T 2207/10016* (2013.01)

(58) Field of Classification Search
CPC ............. G06T 5/50; G06T 2207/10016; G06T 2207/10048; H04N 19/169
See application file for complete search history.

(56) References Cited

U.S. PATENT DOCUMENTS 9,594,943 B1 * 3/2017 Brain ........................ G06T 7/11
10,241,573 B2 * 3/2019 Mallinson ............. A63F 13/235
10,456,685 B2 * 10/2019 Ranjan ................ A63F 13/5258
10,496,157 B2 * 12/2019 Steedly ................. A63F 13/211
10,534,454 B2 * 1/2020 Stafford .................. A63F 13/21
10,996,742 B2 * 5/2021 Connellan ................. G01S 5/30
11,567,528 B2 * 1/2023 Liu ........................ G02B 26/06
(Continued)

OTHER PUBLICATIONS

Yusuke Nakazato, Masayuki Kanbara, Naokazu Yokoya "Localization of wearable users using invisible retro-reflective markers and an IR camera", Proc. SPIE 5664, Stereoscopic Displays and Virtual Reality Systems XII, null (Mar. 22, 2005); https://doi.org/10.1117/12.586382 (Year: 2005).*

(Continued)

*Primary Examiner* — Wesley J Tucker
(74) *Attorney, Agent, or Firm* — Alleman Hall LLP

(57) ABSTRACT

A method of tracking a peripheral device is disclosed. A synchronization request signal is emitted via an infrared (IR) emitter of a head-mounted device (HMD). A peripheral device is configured to activate an IR constellation of IR emitters as acknowledgement of receiving the synchronization request signal. An image frame is captured via a camera of the HMD. It is determined that the peripheral device is synchronized with the HMD based at least on recognizing the activated IR constellation in the image. A peripheral device tracking image frame capture sequence is initiated. The sequence includes a plurality of odd image frames and even image frames. The peripheral device is configured to activate the IR constellation in odd image frames and deactivate the IR constellation in even image frames. A sequence of composite image frames is generated by subtracting content in corresponding even image frames from content in corresponding odd image frames.

20 Claims, 9 Drawing Sheets

(56) References Cited

U.S. PATENT DOCUMENTS

| | | | | |
|---|---|---|---|---|
| 11,819,755 | B2 * | 11/2023 | Zhang | A63F 13/24 |
| 11,896,894 | B2 * | 2/2024 | Wu | A63F 13/211 |
| 11,992,751 | B2 * | 5/2024 | Nietfeld | G06F 3/0346 |
| 12,124,026 | B2 * | 10/2024 | Liu | G02B 26/06 |
| 12,455,617 | B2 * | 10/2025 | Zhang | G06F 3/011 |
| 2015/0029165 | A1 | 1/2015 | Thompson | |
| 2016/0364910 | A1 * | 12/2016 | Higgins | A63F 13/213 |
| 2019/0130184 | A1 * | 5/2019 | Samanta | G02B 27/0093 |
| 2020/0400943 | A1 * | 12/2020 | Kessler | G02B 27/283 |
| 2021/0365064 | A1 * | 11/2021 | Liu | G02B 26/06 |
| 2022/0132052 | A1 * | 4/2022 | Mojaver | A61B 5/0077 |
| 2023/0161374 | A1 * | 5/2023 | Liu | G06F 3/011<br>713/400 |
| 2024/0281071 | A1 * | 8/2024 | Emami | G06V 40/28 |

OTHER PUBLICATIONS

Dorfmüller, K., Wirth, H. (1998). Real-Time Hand and Head Tracking for Virtual Environments Using Infrared Beacons. In: Magnenat-Thalmann, N., Thalmann, D. (eds) CAPTECH 1998. Lecture Notes in Computer Science( ), vol. 1537. Springer, Berl (Year: 1998).*

"IrDA® Standard Protocol Stack Controller with Fixed 9600 Baud Communication Rate", Microchip Technology, 2007, 60 pages.

"Powered by AI: Oculus Insight", accessed on link https://ai.meta.com/blog/powered-by-ai-oculus-insight/, Aug. 22, 2019, 11 pages.

Farasin, et al., "Real-time Object Detection and Tracking in Mixed Reality using Microsoft HoloLens", accessed on link https://core.ac.uk/download/pdf/326909176.pdf, 2020, 8 pages.

* cited by examiner

INTERFERENCE CANCELLATION IN IMAGING FOR CONSTELLATION TRACKING

BACKGROUND

A head-mounted device (HMD) may be configured to employ augmented reality (AR) or virtual reality (VR) technologies to create immersive and interactive experiences for users. AR overlays digital content on the real world, while VR creates a fully synthetic environment of digital content that is displayed to the user. Both AR and VR experiences can be enhanced by additional control input provided by a peripheral device that is held by a user wearing the HMD. The HMD can track a position of the peripheral device using an outward-facing camera of the HMD. In one example, the peripheral device includes an infrared (IR) constellation of IR emitters in a predefined, fixed arrangement relative to one another and relative to the peripheral device. The IR constellation can be activated to emit active IR light that is visible to the outward-facing camera of the HMD while not being visible to the user so as not to distract the user from the immersive and interactive experience. The outward-facing camera of the HMD captures image frames of the IR constellation on the peripheral device and performs image processing on the captured image frames to track the position of the peripheral device relative to the HMD based on the arrangement of the IR emitters relative to one another within the IR constellation. In this way, the position of the peripheral device can be tracked to provide natural user input to the HMD that enhances the AR/VR experience of the user.

SUMMARY

A method of tracking a peripheral device performed by a head-mounted device (HMD) is disclosed. A synchronization request signal is emitted via an infrared (IR) emitter of the HMD to an IR sensor of the peripheral device. The peripheral device is configured to activate an IR constellation of IR emitters as acknowledgement of receiving the synchronization request signal. An image frame is captured via an outward-facing camera of the HMD. It is determined that the peripheral device is synchronized with the HMD based at least on recognizing the activated IR constellation of the peripheral device in the image. A peripheral device tracking image frame capture sequence is initiated based at least on determining that the peripheral device is synchronized with the HMD. The peripheral device tracking image frame capture sequence includes a plurality of alternating odd image frames and even image frames. The peripheral device is configured to activate the IR constellation according to a repeating first time window corresponding to when the outward-facing camera of the HMD captures odd image frames. The peripheral device is configured to deactivate the IR constellation during a repeating second time window corresponding to when the outward-facing camera of the HMD captures even image frames. A sequence of composite image frames is generated by subtracting content in corresponding even image frames from content in corresponding odd image frames such that the sequence of composite image frames includes IR light emitted from the activated IR constellation without other interfering content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
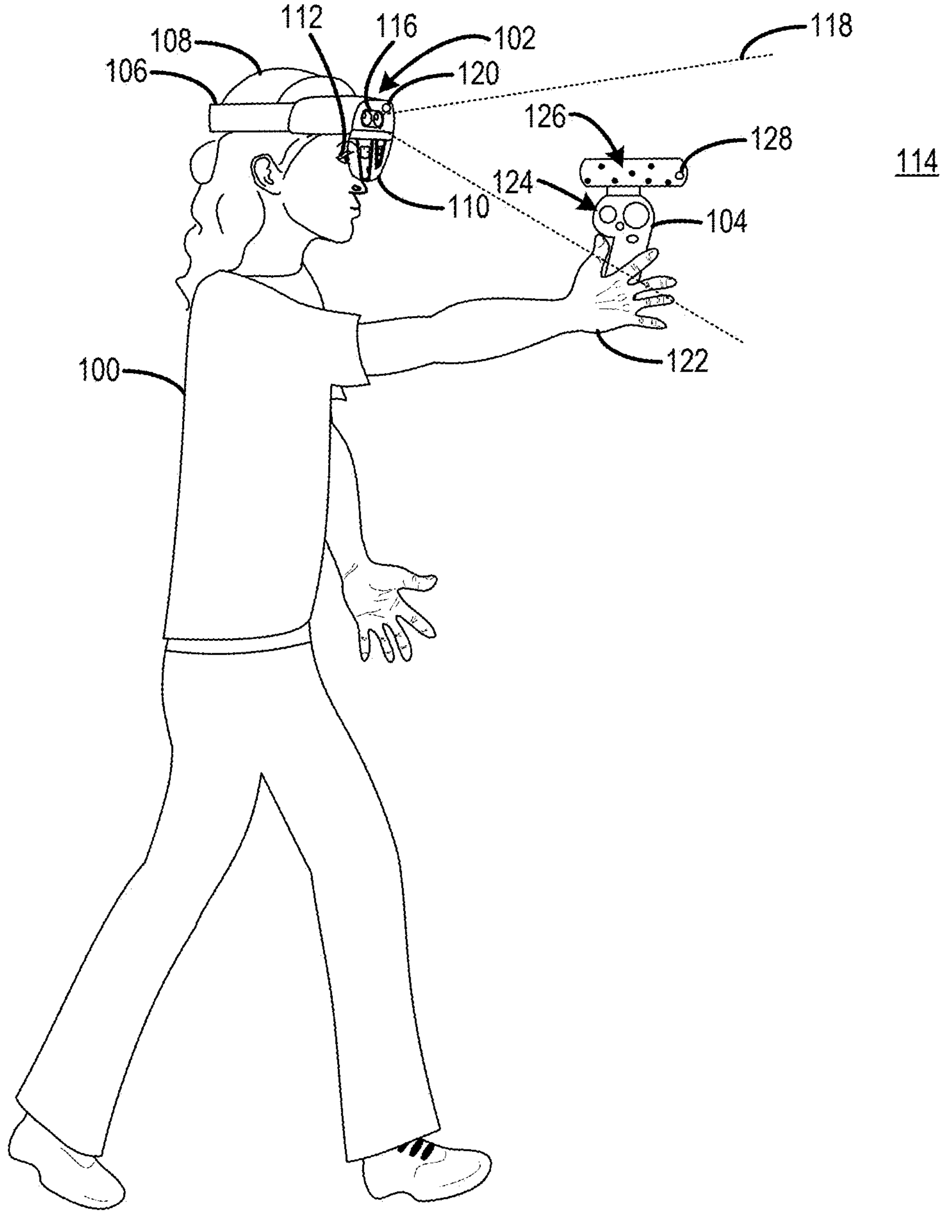
FIG. 1 shows an example scenario of a user interacting with a head-mounted device (HMD) and a peripheral device, wherein a position of the peripheral device is tracked by the HMD.

A position of a peripheral device held can be tracked by an HMD using an outward-facing camera of the HMD. In one example, the peripheral device includes an infrared (IR) constellation of IR emitters in a predefined, fixed arrangement relative to one another and relative to the peripheral device. The IR constellation can be activated to emit active IR light that is visible to the outward-facing camera of the HMD while not being visible to the user so as not to distract the user from the immersive and interactive experience. The outward-facing camera of the HMD captures image frames of the IR constellation on the peripheral device and performs image processing on the captured image frames to track the position of the peripheral device relative to the HMD based on the arrangement of the IR emitters relative to one another within the IR constellation.

However, the real world environment in which the HMD is being used to track the position of the IR constellation on the peripheral device may have unwanted light sources and light reflections that manifest as interference/noise in the image frames captured by the HMD for position tracking of the peripheral device. Such interference/noise is mixed with the light emitted from the IR constellation in the image frames, such that the IR constellation may not be accurately identified by a position tracking algorithm employed by the HMD to track the position of the peripheral device. This issue is exacerbated in especially high lux environments such as outdoor environments in direct sunlight. The interference/noise created by the unwanted light sources and light reflections can result in misdetection of the IR constellation and inaccurate tracking or loss of tracking of the position of the peripheral device that negatively affects the immersive and interactive experience of the user interacting with the HMD and the peripheral device.

Accordingly, the present disclosure is directed to an approach for removing interference/noise from image frames captured by an HMD to improve position tracking accuracy of a peripheral device. In one example, an IR constellation of IR emitters of a peripheral device is activated to emit IR light during odd image frames captured by an outward-facing camera of the HMD, such that the odd image frames include active IR light emitted from the IR constellation and background content. Further, the IR constellation is deactivated during even image frames captured by the outward-facing camera of the HMD, such that the even image frames include the background content with no active IR light emitted from the IR constellation. A sequence of composite image frames is generated by subtracting content in corresponding even image frames from content in corresponding odd image frames, such that the sequence of composite image frames includes IR light emitted from the activated constellation of IR emitters without other interfering background content.

The technical feature of subtracting background content while keeping the IR light emitted from the activated constellation of IR emitters in the sequence of composite image frames provides the technical benefit that the arrangement of the IR constellation is clearly visible in the composite image frames. This allows for the sequence of composite image frames to be used to track the position of the peripheral device with increased accuracy by a tracking algorithm of the HMD relative to using image frames that include interference/noise from unwanted light sources, light reflections, and other background content.

Furthermore, the approach for generating the sequence of composite image frames with reduced interference/noise is supported by a direct optical wireless synchronization (DOWS) protocol that is performed between the HMD and the peripheral device. The DOWS protocol includes one way communication from an IR emitter of the HMD and an IR sensor of the peripheral device to send various synchronization signals that control activation and deactivation of the IR constellation of the peripheral device in synchronicity with image capture. In particular, the DOWS protocol ensures that the IR constellation of the peripheral device is activated and deactivated according to an appropriate timing that is synchronized with a camera exposure timing of the outward-facing camera of the HMD.

The DOWS protocol can be performed to synchronize the HMD with the peripheral device without the need to rely on additional communication hardware (e.g., custom Bluetooth chipset) or complex algorithms that require additional processing resources and incur longer synchronization times. Further, without performing the DOWS protocol, the timing synchronization between the HMD and the peripheral device could shift resulting in generating composite image frames that do not accurately capture the position of the IR constellation without other background content. Additionally, the DOWS protocol can be configured such that the camera exposure time and coordinated activation and deactivation of the IR constellation occurs within a time window that is as reasonably short as possible to reduce power consumption of the IR constellation and the outward-facing camera. This technical feature provides the technical benefit of prolonging battery life of the peripheral device and the HMD.

FIG. 1 shows an example scenario of a user 100 interacting with an HMD 102 and a peripheral device 104. The HMD 102 comprises a frame 106 that is configured to secure the HMD 102 to a head 108 of the user 100. The HMD 102 comprises a display 110 that is coupled to the frame 106 such that the display 110 is positioned in front of eyes 112 of the user 100. In the illustrated example, the HMD 102 is configured as an augmented reality (AR) device and the display 110 is a see-through display that is configured to display digital content that appears to be positioned in a real world environment 116 that the user 100 views through the see-through display. In this way, the digital content augments the real world environment 114 as perceived by the user 100. In other implementations, the display 110 may be configured as a non-see-through display such as in the case of a virtual reality (VR) device.

The HMD 102 comprises an outward-facing camera 116 that is coupled to the frame 106. The outward-facing camera 116 is configured to capture image frames of a field of view (FOV) 118 of the real world environment 114. The outward-facing camera 116 may be any suitable type of camera. In some implementations, the outward-facing camera 116 is a spectral or visible light camera (e.g., a RGB camera). In some implementations, the outward-facing camera 116 is an IR or near IR (NIR) camera. In some implementations, the outward-facing camera 116 is a depth camera. In some implementations, the HMD 102 comprises a plurality of different types of cameras that capture different types of image frames of the real world environment 114. Image frames captured by the outward-facing camera 116 are used by the HMD 102 to generate a sequence of composite image frames having reduced interference/noise for tracking a position of the peripheral device 104 as will be discussed in further detail below.

The HMD 102 comprises an IR emitter 120 that is configured to emit active IR light that is modulated to transmit optical signals that can be detected by an IR sensor 128 of the peripheral device. More particularly, the HMD 102 is configured to control the IR emitter 120 according to the DOWS protocol to synchronize the HMD 102 with the peripheral device 104 for position tracking purposes as will be discussed in further detail below. In one example, the IR emitter 120 is configured to output a universal asynchronous receiver and transmitter (UART) data stream that is encoded into a format that can be sent or received using infrared data association (IrDA).

In the illustrated example, the peripheral device 104 is held in a right hand 122 of the user 100 and the peripheral device 104 is configured as a game controller having user input controls 124 that the user 100 can manipulate to provide user input to a video game that is executed by the HMD 102 and displayed on the display 110 of the HMD 102. Further, a position of the peripheral device 104 is tracked by the HMD 102 to provide natural user input to the video game. In other implementations, the peripheral device may assume another form. For example, in some implementations, the peripheral device may be a tracked object that is used to provide natural user input to the HMD 102 without other user input controls.

The peripheral device 104 comprises an IR constellation 126 of IR emitters in a predefined, fixed arrangement relative to one another and relative to the peripheral device 104. The IR emitters of the IR constellation 126 are configured to be activated and deactivated at the same time so that the IR constellation 126 can be identified based at least on the position of the IR emitters relative to one another.

The peripheral device 104 comprises the IR sensor 128 that is configured to detect optical signals emitted from the IR emitter 120 of the HMD 102 as part of the DOWS protocol to synchronize the HMD 102 with the peripheral device 104 for position tracking purposes. In one example, the IR sensor is configured to detect an IrDA-UART signal and decode the signal to extract a data frame of information related to the DOWS protocol.

The HMD 102 initiates the DOWS protocol by first pairing the HMD 102 with the peripheral device 104. In one example, pairing is achieved by pressing a pairing button 208 (shown in FIG. 2) on the HMD 102 and a pairing button 210 (shown in FIG. 2) on the peripheral device 104. Simultaneous activation of the pairing buttons 208 and 210 cause the HMD 102 and the peripheral device 104 to enter a pairing mode. In the pairing mode, the HMD 102 emits, via the IR emitter 120, a pairing request signal 212 (shown in FIG. 2) to the IR sensor 128 of the peripheral device 104.

The pairing request signal 212 encodes a data frame 300 (shown in FIG. 3) including an identifier 302 (shown in FIG. 3) to be assigned to the peripheral device 104. The peripheral device 104 is configured to store the identifier 302 in on-board memory 214 (shown in FIG. 2) of the peripheral device 104 and activate the IR constellation 126 as acknowledgement of receiving the pairing request signal 212 from the IR emitter 120 of the HMD 102.

In some implementations, the peripheral device 104 is configured to receive the pairing request signal 212 twice without error before activating the IR constellation 126 as acknowledgment of pairing between the HMD 102 and the peripheral device 104. By receiving the pairing request signal 212 twice before sending the acknowledgement, the confidence of the pairing is increased. This makes the pairing process between the HMD 102 and the peripheral device 104 more robust while marginally increasing the overall time to pair the devices.

The HMD 102 is configured to capture an image via the outward-facing camera 116 and determine that the peripheral device 104 is paired with the HMD 102 based at least on recognizing the activated IR constellation 126 of the peripheral device 104 in the image.

Once the HMD 102 and the peripheral device 104 are paired, the HMD 102 is configured to emit, via the IR emitter 120, a synchronization request signal 218 (shown in FIG. 2) to the IR sensor 128 of the peripheral device 104. The peripheral device 104 is configured to activate the IR constellation 126 as acknowledgement of receiving the synchronization request signal 218. The HMD 102 is configured to capture an image via the outward-facing camera 116 and determine that the peripheral device 104 is synchronized with the HMD 102 based at least on recognizing the activated IR constellation 126 of the peripheral device 104 in the image. The peripheral device 104 is configured to activate the IR constellation 126 for a designated duration that is suitably long enough to allow the outward-facing camera 116 to capture an image that includes the activated IR constellation 126.

Based at least on determining that the peripheral device 104 is synchronized with the HMD 102, the HMD 102 is configured to initiate a peripheral device tracking image capture sequence that includes capturing a plurality of alternating odd image frames 220 (shown in FIG. 2) and even image frames 222 (shown in FIG. 2) via the outward-facing camera 116. The peripheral device 104 is configured to activate the IR constellation 126 according to a repeating first time window corresponding to when the outward-facing camera 116 of the HMD 102 captures odd image frames. Further, the peripheral device 104 is configured to deactivate the IR constellation 126 during a repeating second time window corresponding to when the outward-facing camera 116 of the HMD 102 captures even image frames.

The HMD 102 is configured to transmit the synchronization request signal 218 to the peripheral device 104 during each first time window (corresponding to the capture of odd image frames) in order to maintain the synchronization between the HMD 102 and the peripheral device 104.

In some implementations, the HMD 102 is configured to transmit the synchronization request signal 218 to the peripheral device 104 on-demand based at least on both of the pairing buttons 208 and 210 (shown in FIG. 2) being activated at the same time. For example, the user 100 may activate both of the pairing buttons 208 and 210 when synchronization is lost (e.g., due to moving the peripheral device 104 out of range of the IR emitter 120 for longer than a designated time period) in order to manually regain synchronization between the HMD 102 and the peripheral device 104.

The HMD 102 is further configured to, during each first time window and each second time window, emit, via the IR emitter 120, a synchronization signal 224 (shown in FIG. 2) to the IR sensor 128 of the peripheral device 104. The synchronization signal 224 encodes a data frame 300 including an identifier 302 assigned to the peripheral device 104 and optionally a command 304 (shown in FIG. 3) to be performed by the peripheral device 104.

The HMD 102 is configured to capture odd image frames and even image frames via the outward-facing camera 116 after transmitting the synchronization signal 224 during the first and second time windows, respectively. The HMD 102 is configured to transmit the synchronization signal 224 in the first time window after a designated time delay from the time that the synchronization request signal 218 is transmitted such that the outward-facing camera 116 captures the odd image frame during the time duration where the IR constellation 126 is activated.

Further, the HMD 102 is configured to transmit the synchronization signal 224 in the second time window after a designated time delay from a time at which the synchronization request signal 218 is transmitted in the first time window to maintain the correct timing between the first and second time windows. In other words, transmission of the synchronization signal 224 during each first and second time window is used as a trigger to initiate image capture by the outward-facing camera 116 at the correct times to capture odd image frames when the IR constellation 126 is activated and capture even image frames when the IR constellation 126 is deactivated. Accordingly, in this example, the frame rate of the outward-facing camera 116 is twice the activation rate of the IR constellation 126. In one example, the frame rate of the outward-facing camera 116 is 60 Hz and the activation rate of the IR constellation 126 is 30 Hz. The frame rate of the outward-facing camera 116 and the activation rate of the IR constellation 126 may be set to any suitable frame rate/activation rate. In other examples, the IR constellation may be activated at a lower rate (e.g., 1 for every 3 or 5 image captures). The lower IR constellation activation rate can reduce power consumption of the IR constellation, but results in lower position tracking accuracy relative to the higher IR constellation activation rate.

The HMD 102 is configured to generate a sequence of composite image frames 206 (shown in FIG. 2) by subtracting content in corresponding even image frames 222 from content in corresponding odd image frames 220 such that the sequence of composite image frames 206 includes the activated IR constellation 126 without other interfering content. The sequence of composite image frames 206 have reduced interference/noise relative to conventional image frames that include both the IR light emitted from the IR constellation and other background content.

The HMD 102 is configured to track a position 228 of the peripheral device 104 relative to the HMD 102 based at least on recognizing the activated IR constellation 126 of the peripheral device 104 in the sequence of composite image frames 206. The HMD 102 may employ any image processing and position tracking algorithms to track the position 228 of the peripheral device 104. By tracking the position 228 of the peripheral device 104 based at least on performing image processing on the sequence of composite image frames 206 position tracking accuracy may be increased relative to performing position tracking on a conventional image sequence of image that include more interference/noise.

Figure 2:
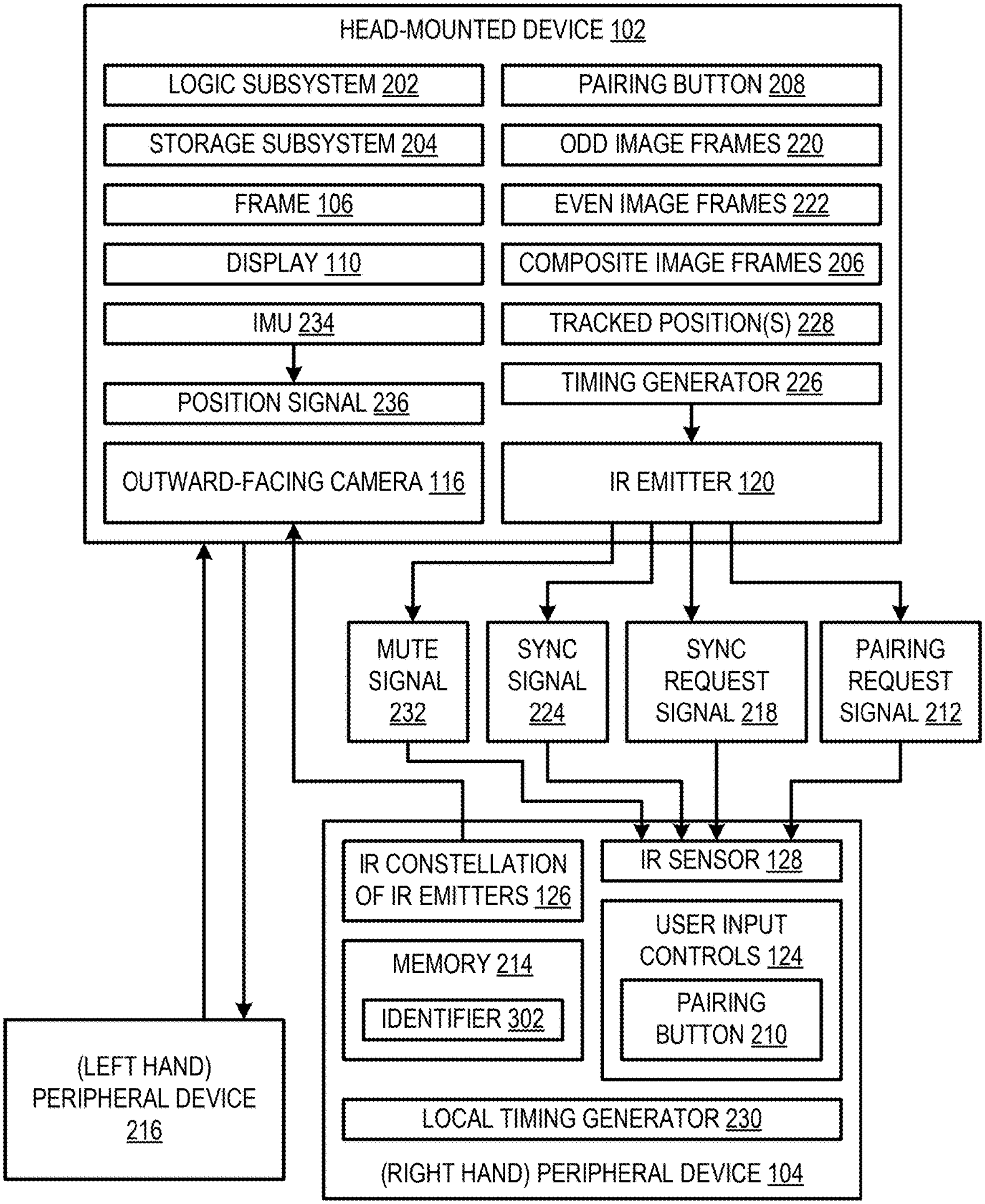
FIG. 2 is a schematic block diagram of the HMD and the peripheral device shown in FIG. 1.

FIG. 2 is a schematic block diagram of the HMD 102 and the peripheral device 104 shown in FIG. 1. The HMD 102 comprises a logic subsystem 202 and a storage subsystem 204 holding instructions executable by the logic subsystem 202 to perform computing operations to control operation of the HMD 102 including conducting the DOWS protocol and the peripheral device tracking image frame capture sequence as will be described in further detail below.

The HMD 102 comprises the frame 106 that is configured to secure the HMD 102 to the head 108 of the user 100. The HMD 102 comprises the display 110 that is coupled to the frame 106 such that the display 110 is positioned in front of eyes 112 of the user 100. The display 110 is configured to display virtual content. In some implementations, the display 110 is configured as a see-through display configured to display AR content. In other implementations, the display 110 is configured as a non-see-through display configured to display VR content.

The HMD 102 is configured to track the position 228 of the peripheral device 104 based at least on analyzing the sequence of composite image frames 206. The composite image frames 206 have reduced interference/noise relative to conventional image frames that are used for position tracking. Such reduced interference/noise in the composite image frames 206 results in increased position tracking accuracy when the sequence of composite image frames 206 are analyzed to track the position 228 of the peripheral device 104.

To support generation of the sequence of composite image frames 206, the HMD 102 is configured to perform the DOWS protocol to synchronize operation between the HMD 102 and the peripheral device 104. The HMD 102 initiates the DOWS protocol by first pairing the HMD 102 with the peripheral device 104. In one example, pairing is achieved by first pressing the pairing button 208 on the HMD 102 and the pairing button 210 on the peripheral device 104. Simultaneous activation of the pairing buttons 208 and 210 cause the HMD 102 and the peripheral device 104 to enter the pairing mode.

In the pairing mode, the HMD 102 emits, via the IR emitter 120, the pairing request signal 212 to the IR sensor 128 of the peripheral device 104. The pairing request signal 212 encodes a data frame 300 (shown in FIG. 3) including an identifier 302 (shown in FIG. 3) to be assigned to the peripheral device 104. The peripheral device 104 is configured to store the identifier 302 in on-board memory 214 and activate the IR constellation 126 as acknowledgement of receiving the pairing request signal 212 from the IR emitter 120 of the HMD 102.

In some implementations, the peripheral device 104 is configured to receive the pairing request signal 212 twice without error before activating the IR constellation 126 as acknowledgment of pairing between the HMD 102 and the peripheral device 104. The HMD 102 is configured to capture an image via the outward-facing camera 116 and determine that the peripheral device 104 is paired with the HMD 102 based at least on recognizing the activated IR constellation 126 of the peripheral device 104 in the image.

The identifier 302 is an individualized identifier that distinguishes the peripheral device 104 from other peripheral devices in scenarios where multiple peripheral devices are interacting with the HMD 102 at the same time. In one example, the peripheral device 104 is held in the right hand of the user and a second peripheral device 216 is held in the left hand of the user. For example, the peripheral devices 104 and 216 may be used as game controllers to play a video game executed by the HMD 102.

Figure 3:
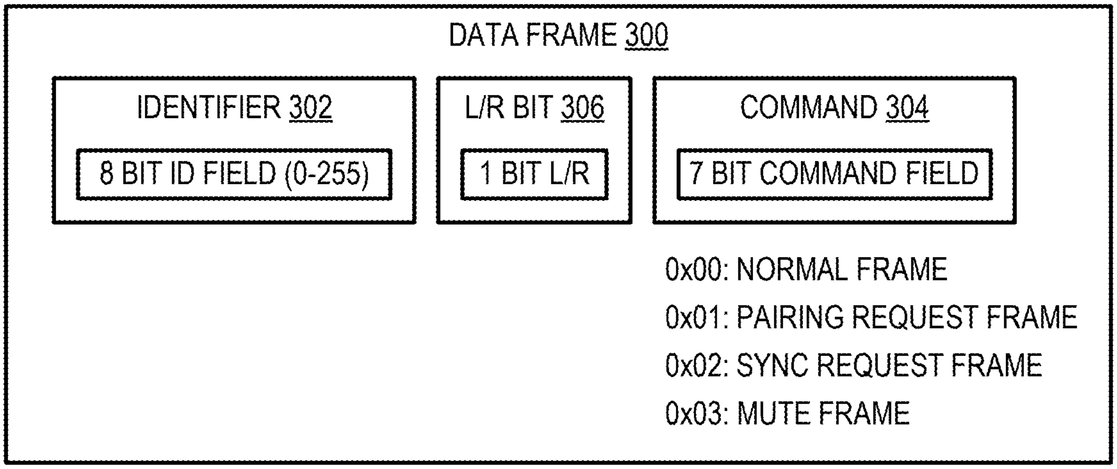
FIG. 3 schematically shows a data frame encoded in a signal transmitted by an infrared (IR) emitter of the HMD shown in FIG. 1 as part of a direct optical wireless synchronization (DOWS) protocol performed by the HMD shown in FIG. 1.

The HMD 102 may transmit different signals (e.g., synchronization request signals and synchronization signals) to the different peripheral devices 104 and 216 as part of the DOWS protocol. As shown in FIG. 3, the data frame 300 encoded in each signal includes the identifier 302 assigned to a peripheral device for which the signal is intended to be transmitted. In one example, the identifier 302 is an 8-bit value that allows for the peripheral device to be distinguished from many other peripheral devices. When a peripheral device receives a signal and decodes it, the peripheral device can check to see if the identifier matches the identifier assigned to the peripheral device and stored in on-board memory. If the identifier does match, then the peripheral device can control operation based on the information conveyed in the data frame 300. If the identifier does not match, then the peripheral device can disregard the data frame as it is intended for a different peripheral device.

The data frame 300 comprises a command 304. The type of command 304 that is included in the data frame 300 may be dependent on the type of signal that encodes the data frame 300. In the illustrated example, the data frame 300 includes a 7-bit command field and different commands are mapped to different values in the command field. In one example, 0x00 is a normal synchronization frame, 0x01 is a pairing request frame, 0x02 is a synchronization request frame, 0x03 is a mute frame, and other values may be mapped to other commands or different signals. The peripheral device performs different operations based at least on the different commands. For the pairing request frame, the peripheral device 104 stores the assigned identifier 302 in on-board memory 214. For the synchronization request frame, the peripheral device 104 activates the IR constellation. For the mute frame, the peripheral device 104 deactivates the IR constellation. The peripheral device 104 may perform other operations based at least on other types of commands.

In some implementations, the data frame 300 may include a left/right bit 306. The left/right bit 306 may be used in scenarios where the user 100 is interacting with two peripheral devices, one in each hand. The left/right bit 306 may indicate whether the particular peripheral device is being held by the left hand of the user 100 or the right hand of the user 100. The behavior of the peripheral device 104 may change depending on which hand is holding and using the peripheral device 104.

Returning to FIG. 2, once the HMD 102 and the peripheral device 104 are paired, the HMD 102 is configured to emit, via the IR emitter 120, a synchronization request signal 218 to the IR sensor 128 of the peripheral device 104. The peripheral device 104 is configured to activate the IR constellation 126 as acknowledgement of receiving the synchronization request signal 218. The HMD 102 is configured to capture an image via the outward-facing camera 116 and determine that the peripheral device 104 is synchronized with the HMD 102 based at least on recognizing the activated IR constellation 126 of the peripheral device

104 in the image. The peripheral device 104 is configured to activate the IR constellation 126 for a designated duration that is suitably long enough to allow the outward-facing camera 116 to capture an image that includes the activated IR constellation 126.

Based at least on determining that the peripheral device 104 is synchronized with the HMD 102, the HMD 102 is configured to initiate the peripheral device tracking image capture sequence that includes capturing the plurality of alternating odd image frames 220 and even image frames 222 via the outward-facing camera 116. The peripheral device 104 is configured to activate the IR constellation 126 according to the repeating first time window corresponding to when the outward-facing camera 116 of the HMD 102 captures odd image frames. Further, the peripheral device 104 is configured to deactivate the IR constellation 126 during the repeating second time window corresponding to when the outward-facing camera 116 of the HMD 102 captures even image frames. In other words, the first time window and the second time window alternatingly repeat during the peripheral device tracking image capture sequence.

The HMD 102 comprises a timing generator 226 that is configured to set the timing of the signals emitted by the IR emitter 120. More particularly, in one example, the timing generator 226 is configured to set the timing of the alternating first and second timing windows based on a time when the HMD 102 recognizes that the peripheral device 104 acknowledges receiving the pairing request signal 212. Further, the HMD 102 is configured to transmit the synchronization request signal 218 to the peripheral device 104 during each first time window (corresponding to odd image frames) in order to maintain the synchronization between the HMD 102 and the peripheral device 104.

In some implementations, the HMD 102 is configured to transmit the synchronization request signal 218 to the peripheral device 104 on-demand based at least on both of the pairing buttons 208 and 210 being activated at the same time. For example, the user 100 may activate both of the pairing buttons 208 and 210 when synchronization is lost (e.g., due to moving the peripheral device 104 out of range of the IR emitter 120 for longer than a designated time period) in order to manually regain synchronization between the HMD 102 and the peripheral device 104.

In some implementations, the peripheral device 104 may be configured to operate based at least on a local timer generated by a local timing generator 230 due to temporary loss of synchronization with the HMD 102. For example, synchronization may be lost due to IR signal interference, blockage, or the peripheral device moving out of the FOV 118 of the outward-facing camera 116. Under such conditions, the peripheral device 104 may not receive the synchronization request signal 218 correctly on every odd frame, and thus the peripheral device 104 is configured to activate the IR constellation 126 temporarily according to the local timer generated by the local timing generator 230 of the peripheral device 104 based at least on the IR sensor 128 of the peripheral device 104 not receiving the synchronization request signal 218 from the IR emitter 120 of the HMD 102 during the first time window. The peripheral device 104 may temporarily operate using the local timer to activate/deactivate the IR constellation 126 until synchronization can be re-established or until a threshold timing drifting is exceeded where the IR constellation is no longer activated within the first timing window that aligns with the camera exposure timing.

The HMD 102 is further configured to, during each first time window and each second time window, emit, via the IR emitter 120, the synchronization signal 224 to the IR sensor 128 of the peripheral device 104. The HMD 102 is configured to capture odd image frames and even image frames via the outward-facing camera 116 after transmitting the synchronization signal during the first and second time windows, respectively. The HMD 102 is configured to transmit the synchronization signal 224 in the first time window after a designated time delay from a time at which the synchronization request signal 212 is transmitted such that the outward-facing camera 116 captures the odd image frame during the time duration where the IR constellation 126 is activated. Further, the HMD 102 is configured to transmit the synchronization signal 224 in the second time window after a designated time delay from a time at which the synchronization request signal 212 is transmitted in the first time window to maintain the correct timing between the first and second time windows. In other words, transmission of the synchronization signal during each first and second time window is used as a trigger to initiate image capture by the outward-facing camera 116 at the correct times to capture odd image frames when the IR constellation 126 is activated and capture even image frames when the IR constellation 126 is deactivated.

Figure 4:
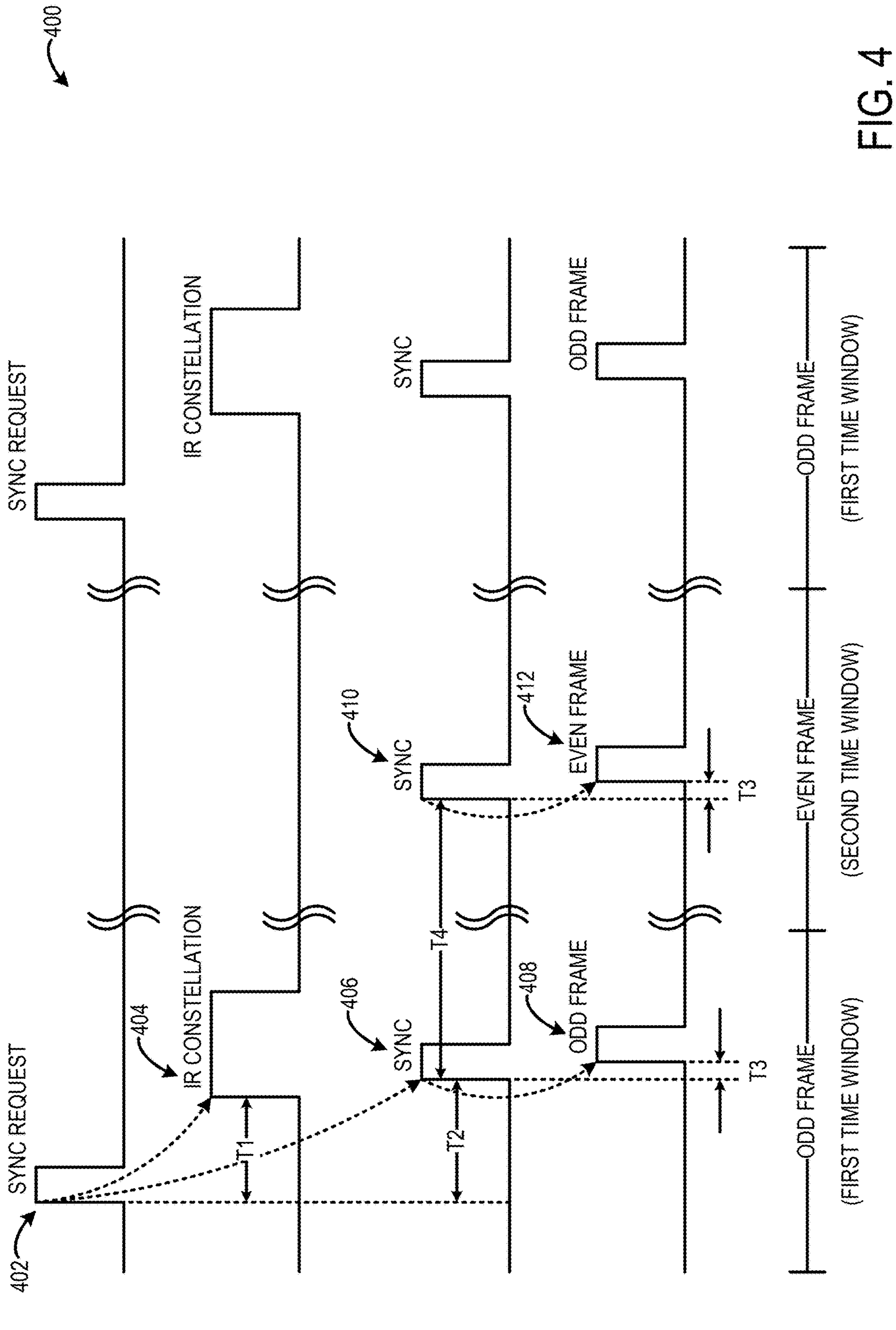
FIG. 4 shows an example timing diagram of operations that are performed when conducting the DOWS protocol.

FIG. 4 shows an example timing diagram 400 of operations that are performed when conduct the DOWS protocol. At 402, the IR emitter 120 of the HMD 102, emits the synchronization request signal to the IR sensor 128 of the peripheral device 104. Transmission of the synchronization request signal initiated the first time window. At 404, the IR constellation 126 of the peripheral device 104 is activated as acknowledgement of receiving the synchronization request signal. The IR constellation 126 is activated after a first time delay (T1) from the time when the synchronization request signal is transmitted. At 406, the IR emitter 120 of the HMD 102, emits the synchronization signal to the IR sensor 128 of the peripheral device 104. The synchronization signal is transmitted after a second delay time (T2) from the time when the synchronization request signal is transmitted. The second delay time (T2) is greater than the first delay time (T1). The second delay time (T2) is set to be greater than the first delay time (T1) to ensure that the camera exposure to capture the odd image frame occurs while the IR constellation is activated. At 408, the outward-facing camera 116 captures the odd image frame. The outward-facing camera 116 captures the odd image frame after a third delay time (T3) from the time when the synchronization signal is transmitted. In other words, transmission of the synchronization signal acts as a trigger for the outward-facing camera 116 to capture the odd image frame. In the illustrated example, the odd image frame is captured in the middle of the duration for which the IR constellation 126 is activated.

At 410, the IR emitter 120 of the HMD 102, emits the synchronization signal to the IR sensor 128 of the peripheral device 104 for the even frame. The synchronization signal is transmitted for the even frame after a fourth time delay (T4) from the time that the synchronization signal is transmitted for the odd frame. The fourth time delay (T4) is consistent from frame to frame to maintain synchronization on a frame-by-frame basis. At 412, the outward-facing camera 116 captures the even image frame. The outward-facing camera 116 captures the even image frame after the same third delay time (T3) from the time when the synchronization signal is transmitted for the even frame.

The above described operations are repeated for each odd and even frame (also referred to as repeating first and second time windows) of the peripheral device tracking image capture sequence. The peripheral device tracking image capture sequence may include capturing any suitable number of odd and even image frames that may be used to generate the sequence of composite image frames 206.

Due to possible movement of the head of the user between adjacent odd and even frames, in some examples, the timing of the even frame is started as early as possible relative to the previous odd frame. To that end, in some examples, the fourth time delay (T4) can be reduced as much as possible taking into consideration the image capture speed settings of the particular outward-facing camera 116 that is employed in the HMD 102. Such timing can reduce the effects of movement of the head of the user between frames, and thus reduce the impact of the head movement on interference/noise cancelation in the composite image frames.

Returning to FIG. 2, the HMD 102 is configured to generate the sequence of composite image frames 206 by subtracting content in corresponding even image frames 220 from content in corresponding odd image frames 222 such that the sequence of composite image frames 206 includes the activated IR constellation 126 without other interfering content. The composite image frames 206 have reduced interference/noise relative to conventional image frames that include both the IR light emitted from the IR constellation and other background content.

Figure 5:
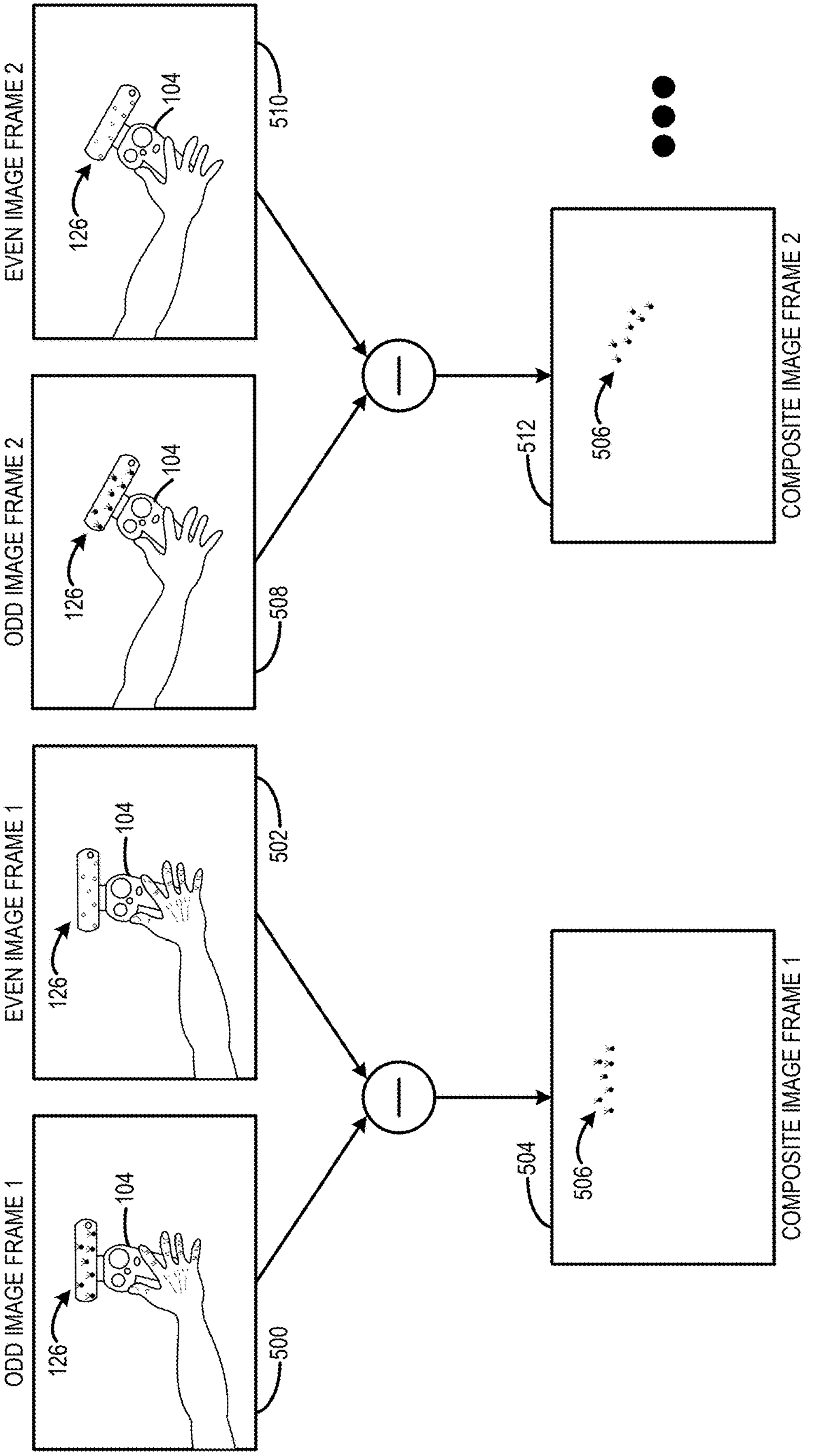
FIG. 5 schematically shows example image processing operations that are performed to generate a sequence of composite image frames including an activated IR constellation of a peripheral device without other interfering content.

FIG. 5 schematically shows example image processing operations to generate the sequence of composite image frames 206 that include IR light emitted from the activated IR constellation 126 of the peripheral device 104 without other interfering content. A first odd image frame 500 is captured while the IR constellation 126 is activated such that the IR emitters emit IR light. A first even image frame 502 is captured right after the first odd image frame 500 is captured. In the first odd and even image frames 502, 504, the peripheral device 104 assumes a first position. The first even image frame 502 is captured while the IR constellation 126 is deactivated such that the IR emitters do not emit IR light. The content of the first even image 502 is subtracted from the content of the first odd image frame 500 to generate a first composite image 504. The first composite image 504 includes IR light 506 emitted from the activated IR constellation 126 without other background content.

Next, a second odd image frame 508 is captured while the IR constellation 126 is activated such that the IR emitters emit IR light. A second even image frame 510 is captured right after the second odd image frame 508 is captured. In the second odd and even image frames 508, 510, the peripheral device 104 assumes a second position different than the first position. The second even image frame 510 is captured while the IR constellation 126 is deactivated such that the IR emitters do not emit IR light. The content of the second even image 510 is subtracted from the content of the second odd image 508 to generate a second composite image 512. The second composite image 512 includes IR light 506 emitted from the activated IR constellation 126 without other background content.

Additional composite image frames can be generated in the same manner as described above that can be included in the sequence of composite image used to track the position of the peripheral device 104.

Returning to FIG. 2, the HMD 102 is configured to track the position 228 of the peripheral device 104 relative to the HMD 102 based at least on recognizing the activated IR constellation 126 of the peripheral device 104 in the sequence of composite image frames 206. The HMD 102 may employ any image processing and position tracking algorithms to track the position 228 of the peripheral device 104. By tracking the position 228 of the peripheral device 104 based at least on performing image processing on the sequence of composite image frames 206 position tracking accuracy may be increased relative to performing position tracking on a conventional image sequence that has greater interference/noise.

In some implementations, the HMD 102 is configured to recognize IR light emitted from an unknown IR constellation in addition to IR light emitted from the IR constellation 126 of the peripheral device 104 in a composite image frame of the sequence of composite image frames 206. The HMD 102 may recognize the unknown IR constellation while performing the DOWS protocol with the peripheral device 104. For example, such a scenario may arise when multiple users wearing HMD and holding peripheral devices are interacting with each other in a shared AR experience. More particularly, a peripheral device held by another user may appear in the FOV 118 of the outward-facing camera. During a next repeating time window subsequent to recognizing the unknown IR constellation, the HMD 102 is configured to emit, via the IR emitter of the HMD, a mute signal 232 to the IR sensor 128 of the peripheral device 104 that includes a mute command to deactivate the IR constellation 126 during capture of a next odd image frame. In response to receiving the mute signal 232, the peripheral device 104 is configured to deactivate the IR constellation 126 during the next odd image frame. If the peripheral device 104 did not receive the mute signal 232, the peripheral device 104 would typically activate the IR constellation 126 during an odd image frame. The HMD 102 captures an odd image frame of the peripheral device 104 while the IR constellation 126 is deactivated. The HMD 102 is configured to filter IR light emitted from the unknown IR constellation out of the next composite image frame and other composite image frames subsequent to the next odd image frame in the sequence to generate composite image frames without IR light emitted from the unknown IR constellation. In this way, the IR light emitted from the IR constellation of the other IR device does not cause misdetection of the IR constellation 126 and inaccurate tracking or loss of tracking of the position of the peripheral device 104.

In some implementations, the HMD 102 comprises an inertial measurement unit (IMU) 234 that is configured to output a position signal 236 indicating a position of the HMD 102. The IMU 234 may comprise accelerometers, gyroscopes, and/or a compass that can detect, for example, a 6 degree of freedom (6DOF) position and orientation of the HMD device 102 and by association the head 108 of the user 100. In some implementations, the HMD 102 may be configured to refine the position of the HMD 102 indicated by the position signal 236 (e.g., the 6DOF position) using the image frames output from the outward-facing camera 116 to track movement of the HMD 102. In some implementations, the HMD 102 is configured to determine the speed and direction of movement of the HMD 102 based at least on the position signal 236 output by the IMU 234. The HMD 102 may be configured to generate each composite image frame in the sequence of composite image frames 206 based at least on a change in position (and/or speed and direction) of the HMD 102 between corresponding odd and even image frames that are used to generate the composite image. In this way, the HMD 102 can compensate for image frame displacement between two adjacent odd and even image frames in order to improve interference/noise cancellation in composite image frames generated by the HMD 102.

Figure 6A:
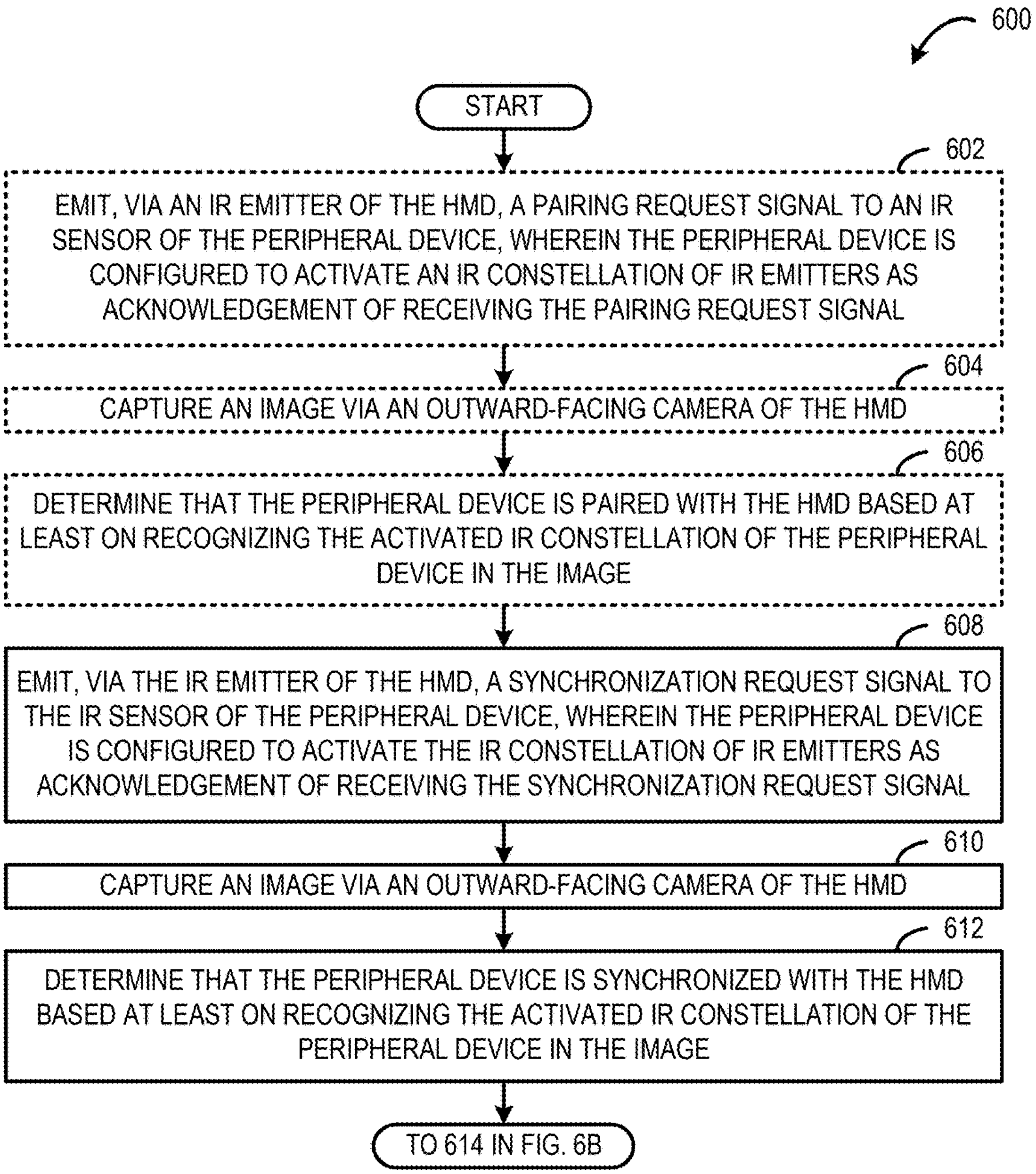
FIGS. 6A, 6B, and 6C show an example method of tracking a peripheral device performed by an HMD.
Figure 6B:
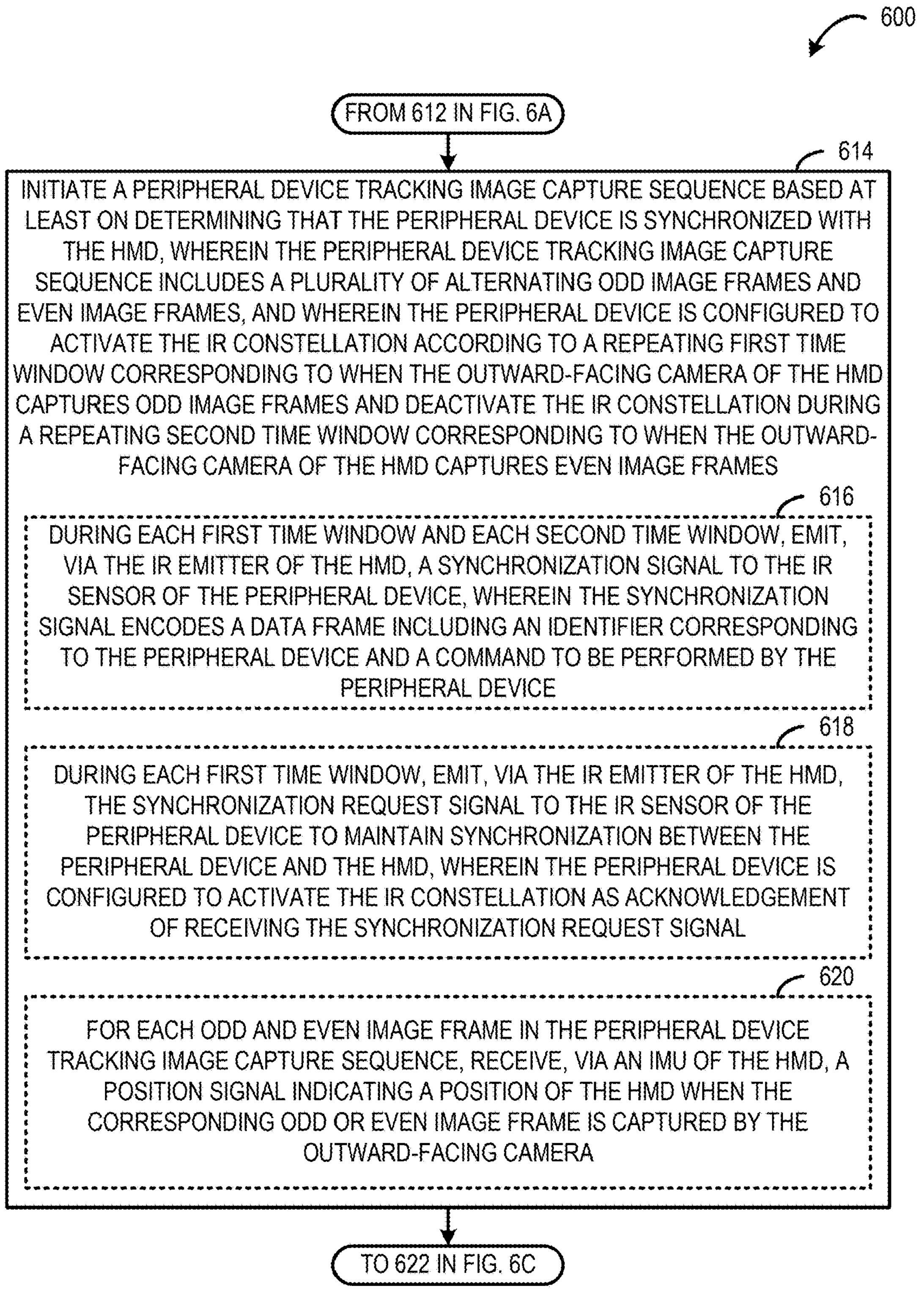
Figure 6C:
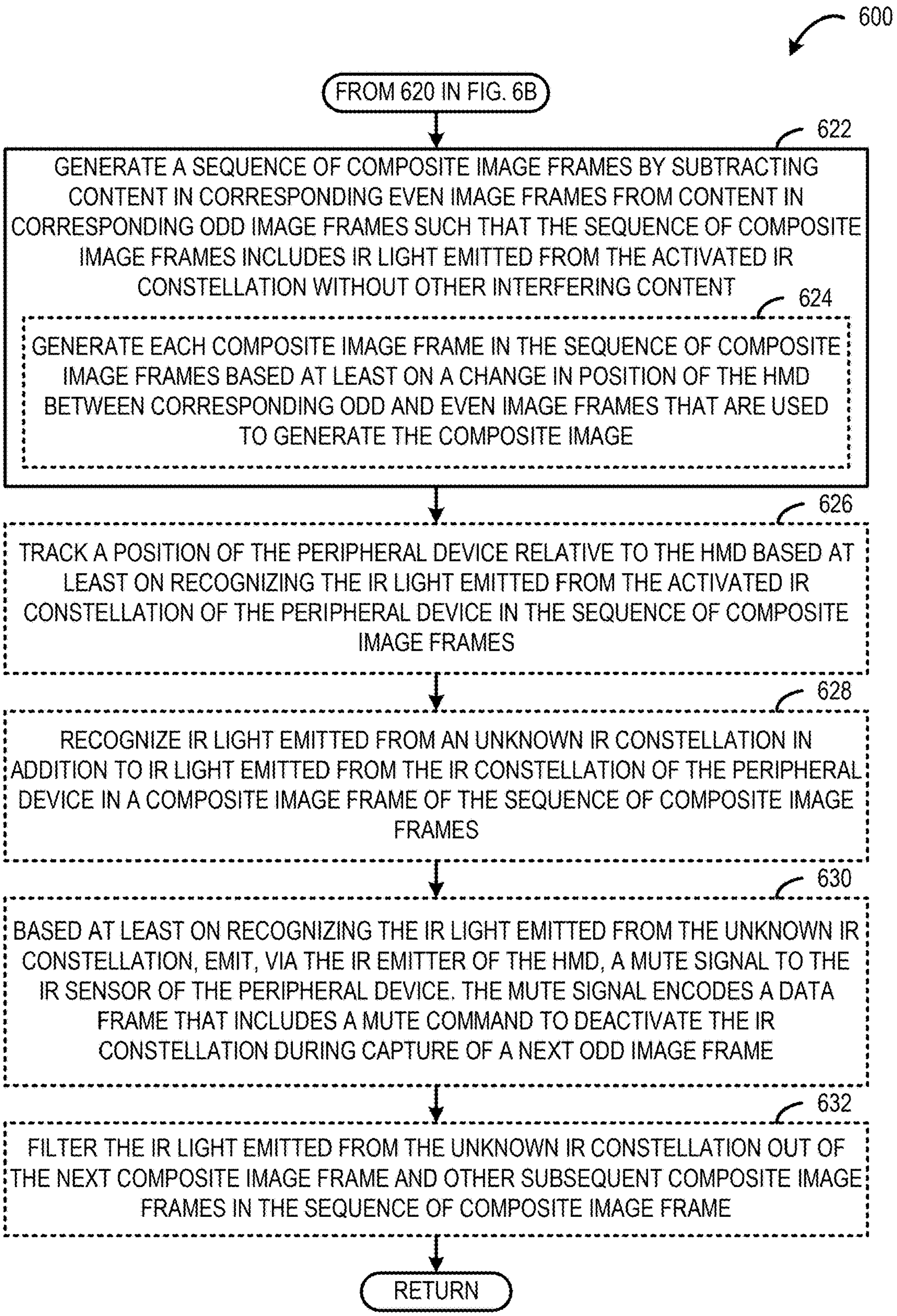

FIGS. 6A, 6B, and 6C show an example method 600 of tracking a peripheral device performed by an HMD. For example, the method 600 may be performed by the HMD 102 shown in FIGS. 1 and 2, or any other suitable type of HMD. Note that method step that are indicated in dotted lines optionally may be performed in some implementations.

In FIG. 6A, the HMD is configured to communicate with the peripheral device to conduct the DOWS protocol to synchronize the peripheral device with the HMD. In some implementations, at 602, the method 600 includes emitting, via an IR emitter of the HMD, a pairing request signal to an IR sensor of the peripheral device. The pairing request signal encodes a data frame including an identifier to be assigned to the peripheral device. The peripheral device is configured to store the identifier in on-board memory and activate an IR constellation of IR emitters of the peripheral device as acknowledgement of receiving the pairing request signal from the IR emitter of the HMD. In some implementations, at 604, the method 600 may include capturing an image via an outward-facing camera of the HMD. In some implementations, at 606, the method 600 may include determining that the peripheral device is paired with the HMD based at least on recognizing the activated IR constellation of the peripheral device in the image.

At 608, the method 600 includes emitting, via the IR emitter of the HMD, a synchronization request signal to the IR sensor of the peripheral device. The peripheral device is configured to activate the IR constellation of IR emitters as acknowledgement of receiving the synchronization request signal. At 610, the method 600 includes capturing an image via an outward-facing camera of the HMD. At 612, the method 600 includes determining that the peripheral device is synchronized with the HMD based at least on recognizing the activated IR constellation of the peripheral device in the image.

In FIG. 6B, at 614, the method 600 includes initiating a peripheral device tracking image capture sequence based at least on determining that the peripheral device is synchronized with the HMD. The peripheral device tracking image capture sequence includes a plurality of alternating odd image frames and even image frames. The peripheral device is configured to activate the IR constellation according to a repeating first time window corresponding to when the outward-facing camera of the HMD captures odd image frames and deactivate the IR constellation during a repeating second time window corresponding to when the outward-facing camera of the HMD captures even image frames.

In some implementations, at 616, the method 600 may include during each first time window and each second time window, emitting, via the IR emitter of the HMD, a synchronization signal to the IR sensor of the peripheral device. The synchronization signal encodes a data frame including an identifier corresponding to the peripheral device and a command to be performed by the peripheral device.

In some implementations, at 618, the method 600 may include during each first time window, emitting, via the IR emitter of the HMD, the synchronization request signal to the IR sensor of the peripheral device to maintain synchronization between the peripheral device and the HMD. The peripheral device is configured to activate the IR constellation as acknowledgement of receiving the synchronization request signal.

In some implementations, at 620, the method 600 may include, for each odd and even image frame in the peripheral device tracking image capture sequence, receiving, from an IMU of the HMD, a corresponding position signal indicating a position of the HMD when the corresponding odd or even image frame is captured by the outward-facing camera.

In FIG. 6C, at 622, the method 600 includes generating a sequence of composite image frames by subtracting content in corresponding even image frames from content in corresponding odd image frames such that the sequence of composite image frames includes IR light emitted from the activated IR constellation without other interfering content.

In some implementations, at 624, the method 600 may include generating each composite image frame in the sequence of composite image frames based at least on a change in position of the HMD between corresponding odd and even image frames that are used to generate the composite image. The HMD can determine the change in position of the HMD based on a difference between position signals received from the IMU between adjacent odd and even image frames in the peripheral device tracking image capture sequence.

In some implementations, at 626, the method 600 may include tracking a position of the peripheral device relative to the HMD based at least on recognizing the IR light emitted from the activated IR constellation of the peripheral device in the sequence of composite image frames.

In some implementations, at 628, the method 600 may include recognizing IR light emitted from an unknown IR constellation in addition to IR light emitted from the IR constellation of the peripheral device in a composite image frame of the sequence of composite image frames. At 630, the method 600 may include based at least on recognizing the IR light emitted from the unknown IR constellation, emitting, via the IR emitter of the HMD, a mute signal to the IR sensor of the peripheral device. The mute signal encodes a data frame that includes a mute command to deactivate the IR constellation during capture of a next odd image frame. At 632, the method 600 may include filtering the IR light emitted from the unknown IR constellation out of the next composite image frame and other subsequent composite image frames in the sequence of composite image frame.

The method 600 may be performed to generate a sequence of composite image frames that includes IR light emitted from the activated constellation of IR emitters without other interfering background content. This allows for the sequence of composite image frames to be used to track the position of the peripheral device with increased accuracy by a tracking algorithm of the HMD relative to using image frames that include interference/noise from unwanted light sources, light reflections, and other background content. Furthermore, by carrying out the DOWS protocol between the HMD and the peripheral device, it ensures that the IR constellation of the peripheral device is activated and deactivated according to an appropriate timing that is synchronized with a camera exposure timing of the outward-facing camera of the HMD to make sure the composite image frames appropriately capture the IR light emitted from the IR constellation without including other background content.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
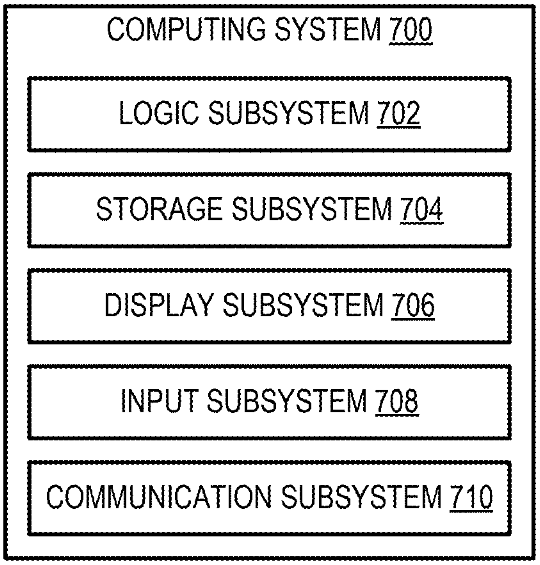
FIG. 7 shows an example computing system.

FIG. 7 schematically shows a simplified representation of a computing system 700 configured to provide any to all of the compute functionality described herein. For example, the computing system 700 may correspond to the HMD 102 shown in FIGS. 1 and 2, the peripheral device 104 shown in FIGS. 1 and 2, and the peripheral device 216 shown in FIG. 2. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem may optionally be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

The term "module" may be used to describe an aspect of computing system 700 implemented to perform a particular function. In some cases, a module may be instantiated via logic subsystem 702 executing instructions held by storage subsystem 704. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

In an example, a method of tracking a peripheral device performed by a head-mounted device (HMD) comprises emitting, via an infrared (IR) emitter of the HMD, a synchronization request signal to an IR sensor of the peripheral device, wherein the peripheral device is configured to activate an IR constellation of IR emitters as acknowledgement of receiving the synchronization request signal, capturing an image via an outward-facing camera of the HMD, determining that the peripheral device is synchronized with the HMD based at least on recognizing the activated IR constellation of the peripheral device in the image, based at least on determining that the peripheral device is synchronized with the HMD, initiating a peripheral device tracking image capture sequence including a plurality of alternating odd image frames and even image frames, wherein the peripheral device is configured to activate the IR constellation according to a repeating first time window corresponding to when the outward-facing camera of the HMD captures odd image frames and deactivate the IR constellation during a repeating second time window corresponding to when the outward-facing camera of the HMD captures even image frames, and generating a sequence of composite image frames by subtracting content in corresponding even image frames from content in corresponding odd image frames such that the sequence of composite image frames includes IR light emitted from the activated IR constellation without other interfering content. In this example and/or other examples, the method may further comprise tracking a position of the peripheral device relative to the HMD based at least on recognizing the IR light emitted from the activated IR constellation of the peripheral device in the sequence of composite image frames. In this example and/or other examples, the method may further comprise based at least on determining that the peripheral device is synchronized with the HMD, during each first time window and each second time window, emitting, via the IR emitter of the HMD, a synchronization signal to the IR sensor of the peripheral device, the synchronization signal may encode a data frame including an identifier corresponding to the peripheral device and a command to be performed by the peripheral device. In this example and/or other examples, the outward-facing camera of the HMD may be configured to capture each odd image frame subsequent to a corresponding synchronization signal being emitted via the IR emitter of the HMD in the first time window and capture each even image frame subsequent to a corresponding synchronization signal being emitted via the IR emitter of the HMD in the second time window. In this example and/or other examples, the peripheral device may be a first peripheral device held in a left hand of a user wearing the HMD, the IR constellation may be a first IR constellation, the HMD may be configured to track a second peripheral device held in a right hand of a user wearing the HMD, the second peripheral device may have a second IR constellation different than the first IR constellation, the data frame may include a bit indicating whether the peripheral device is a left-hand peripheral device held in the left hand of the user or a right-hand peripheral device held in the right hand of the user. In this example and/or other examples, the method may further comprise during each first time window, emitting, via the IR emitter of the HMD, the synchronization request signal to the IR sensor of the peripheral device to maintain synchronization between the peripheral device and the HMD, and the peripheral device may be configured to activate the IR constellation as acknowledgement of receiving the synchronization request signal. In this example and/or other examples, the peripheral device may be configured to activate the IR constellation temporarily according to a local timer of the peripheral device based at least on the IR sensor of the peripheral device not receiving the synchronization request signal from the IR emitter of the HMD during the first time window. In this example and/or other examples, the method may further comprise emitting, via the IR emitter of the HMD, a pairing request signal to the IR sensor of the peripheral device, the pairing request signal may encode a data frame including an identifier to be assigned to the peripheral device, and the peripheral device may be configured to store the identifier in on-board memory and activate the IR constellation as acknowledgement of receiving the pairing request signal from the IR emitter of the HMD. In this example and/or other examples, the method further comprise recognizing IR light emitted from an unknown IR constellation in addition to IR light emitted from the IR constellation of the peripheral device in a composite image frame of the sequence of composite image frames, based at least on recognizing the IR light emitted from the unknown IR constellation, emitting, via the IR emitter of the HMD, a mute signal to the IR sensor of the peripheral device, wherein the mute signal encodes a data frame that includes a mute command to deactivate the IR constellation during capture of a next odd image frame, and filtering the IR light emitted from the unknown IR constellation out of the next composite image frame and other subsequent composite image frames in the sequence of composite image frame.

In another example a head-mounted device (HMD) comprises an infrared (IR) emitter, an outward-facing camera, a logic subsystem, and a storage subsystem holding instruction executable by the logic subsystem to emit, via the IR emitter, a synchronization request signal to an IR sensor of a peripheral device, wherein the peripheral device is configured to activate an IR constellation of IR emitters as acknowledgement of receiving the synchronization request signal, capture an image via the outward-facing camera, determine that the peripheral device is synchronized with the HMD based at least on recognizing the activated IR constellation of the peripheral device in the image, based at least on determining that the peripheral device is synchronized with the HMD, initiate a peripheral device tracking image capture sequence including a plurality of alternating odd image frames and even image frames, wherein the peripheral device is configured to activate the IR constellation according to a repeating first time window corresponding to when the outward-facing camera captures odd image frames and deactivate the IR constellation during a repeating second time window corresponding to when the outward-facing camera captures even image frames, and generate a sequence of composite image frames by subtracting content in corresponding even image frames from content in corresponding odd image frames such that the sequence of composite image frames includes IR light emitted from the activated IR constellation without other interfering content. In this example and/or other examples, the storage subsystem may hold instructions executable by the logic subsystem to track a position of the peripheral device relative to the HMD based at least on recognizing the IR light emitted from the activated IR constellation of the peripheral device in the sequence of composite image frames. In this example and/or other examples, the storage subsystem may hold instructions executable by the logic subsystem to based at least on determining that the peripheral device is synchronized with the HMD, during each first time window and each second time window, emit, via the IR emitter of the HMD, a synchronization signal to the IR sensor of the peripheral device, the synchronization signal may encode a data frame that includes an identifier corresponding to the peripheral device and a command to be performed by the peripheral device. In this example and/or other examples, the outward-facing camera may be configured to capture each odd image frame subsequent to a corresponding synchronization signal being emitted via the IR emitter in each first time window and capture each even image frame subsequent to a corresponding synchronization signal being emitted via the IR emitter of the HMD in each second time window. In this example and/or other examples, the peripheral device may be a first peripheral device held in a left hand of a user wearing the HMD, the IR constellation may be a first IR constellation, the HMD may be configured to track a second peripheral device held in a right hand of a user wearing the HMD, the second peripheral device may have a second IR constellation different than the first IR constellation, the synchronization signal may encode a data frame including a bit indicating whether the peripheral device is a left-hand peripheral device held in the left hand of the user or a right-hand peripheral device held in the right hand of the user. In this example and/or other examples, the storage subsystem may hold instructions executable by the logic subsystem to during each first time window, emit via the IR emitter, the synchronization request signal to the IR sensor of the peripheral device to maintain synchronization between the peripheral device and the HMD, and the peripheral device may be configured to activate the IR constellation as acknowledgement of receiving the synchronization request signal. In this example and/or other examples, the peripheral device may be configured to activate the IR constellation temporarily according to a local timer of the peripheral device based at least on the IR sensor of the peripheral device not receiving the synchronization request signal from the IR emitter of the HMD during the first time window. In this example and/or other examples, the storage subsystem may hold instructions executable by the logic subsystem to emit, via the IR emitter of the HMD, a pairing request signal to the IR sensor of the peripheral device, the pairing request signal may encode a data frame including an identifier to be assigned to the peripheral device, and the peripheral device may be configured to store the identifier in on-board memory and activate the IR constellation as acknowledgement of receiving the identifier signal from the IR emitter of the HMD. In this example and/or other examples, the storage subsystem may hold instructions executable by the logic subsystem to recognize IR light emitted from an unknown IR constellation in addition to IR light emitted from the IR constellation of the peripheral device in a composite image frame of the sequence of composite image frames, based at least on recognizing the IR light emitted from the unknown IR constellation, emit, via the IR emitter of the HMD, a mute signal to the IR sensor of the peripheral device that includes a mute command to deactivate the IR constellation during capture of a next odd image frame, and filter the IR light emitted from the unknown IR constellation out of the next composite image frame and other subsequent composite image frames in the sequence of composite image frame. In this example and/or other examples, the HMD may further comprise an inertial measurement unit (IMU) configured to output a position signal indicating a position of the HMD, and the storage subsystem may hold instructions executable by the logic subsystem to for each odd and even image frame in the peripheral device tracking image capture sequence, receive, from the IMU of the HMD, a corresponding position signal indicating a position of the HMD when the corresponding odd or even image frame is captured by the outward-facing camera, and each composite image frame in the sequence of composite image frames may be generated based at least on a change in position of the HMD between corresponding odd and even image frames that are used to generate the composite image.

In yet another example, a method of tracking a peripheral device performed by a head-mounted device (HMD) comprises emitting, via an IR emitter of the HMD, a pairing request signal to an IR sensor of the peripheral device, wherein the pairing request signal encodes a data frame including an identifier to be assigned to the peripheral device, and wherein the peripheral device is configured to store the identifier in on-board memory and activate an IR constellation of IR emitters as acknowledgement of receiving the pairing request signal from the IR emitter of the HMD, capturing a first image via an outward-facing camera of the HMD, determining that the peripheral device is paired with the HMD based at least on recognizing the activated IR constellation of the peripheral device in the first image, based at least on determining that the peripheral device is paired with the HMD, emitting, via the IR emitter of the HMD, a synchronization request signal to the IR sensor of the peripheral device, wherein the peripheral device is configured to activate the IR constellation as acknowledgement of receiving the synchronization request signal, capturing a second image via the outward-facing camera of the HMD, determining that the peripheral device is synchronized with the HMD based at least on recognizing the activated IR constellation of the peripheral device in the second image, based at least on determining that the peripheral device is synchronized with the HMD, initiating a peripheral device tracking image capture sequence including a plurality of alternating odd image frames and even image frames, wherein the peripheral device is configured to activate the IR constellation according to a repeating first time window corresponding to when the outward-facing camera of the HMD captures odd image frames and deactivate the IR constellation during a repeating second time window corresponding to when the outward-facing camera of the HMD captures even image frames, and generating a sequence of composite image frames by subtracting content in corresponding even image frames from content in corresponding odd image frames such that the sequence of composite image frames includes IR light emitted from the activated IR constellation without other interfering content.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of tracking a peripheral device performed by a head-mounted device (HMD), the method comprising:

emitting, via an infrared (IR) emitter of the HMD, a synchronization request signal to an IR sensor of the peripheral device, wherein the peripheral device is configured to activate an IR constellation of IR emitters as acknowledgement of receiving the synchronization request signal;

capturing an image via an outward-facing camera of the HMD;

determining that the peripheral device is synchronized with the HMD based at least on recognizing the activated IR constellation of the peripheral device in the image;

based at least on determining that the peripheral device is synchronized with the HMD, initiating a peripheral device tracking image capture sequence including a plurality of alternating odd image frames and even image frames, wherein the peripheral device is configured to activate the IR constellation according to a repeating first time window corresponding to when the outward-facing camera of the HMD captures odd image frames and deactivate the IR constellation during a repeating second time window corresponding to when the outward-facing camera of the HMD captures even image frames; and generating a sequence of composite image frames by subtracting content in corresponding even image frames from content in corresponding odd image frames such that the sequence of composite image frames includes IR light emitted from the activated IR constellation without other interfering content.

2. The method of claim 1, further comprising:

tracking a position of the peripheral device relative to the HMD based at least on recognizing the IR light emitted from the activated IR constellation of the peripheral device in the sequence of composite image frames.

3. The method of claim 1, further comprising:

based at least on determining that the peripheral device is synchronized with the HMD, during each first time window and each second time window, emitting, via the IR emitter of the HMD, a synchronization signal to the IR sensor of the peripheral device, wherein the synchronization signal encodes a data frame including an identifier corresponding to the peripheral device and a command to be performed by the peripheral device.

4. The method of claim 3, wherein the outward-facing camera of the HMD is configured to capture each odd image frame subsequent to a corresponding synchronization signal being emitted via the IR emitter of the HMD in the first time window and capture each even image frame subsequent to a corresponding synchronization signal being emitted via the IR emitter of the HMD in the second time window.

5. The method of claim 3, wherein the peripheral device is a first peripheral device held in a left hand of a user wearing the HMD, wherein the IR constellation is a first IR constellation, wherein the HMD is configured to track a second peripheral device held in a right hand of a user wearing the HMD, wherein the second peripheral device has a second IR constellation different than the first IR constellation, wherein the data frame includes a bit indicating whether the peripheral device is a left-hand peripheral device held in the left hand of the user or a right-hand peripheral device held in the right hand of the user.

6. The method of claim 1, further comprising:

during each first time window, emitting, via the IR emitter of the HMD, the synchronization request signal to the IR sensor of the peripheral device to maintain synchronization between the peripheral device and the HMD, and wherein the peripheral device is configured to activate the IR constellation as acknowledgement of receiving the synchronization request signal.

7. The method of claim 6, wherein the peripheral device is configured to activate the IR constellation temporarily according to a local timer of the peripheral device based at least on the IR sensor of the peripheral device not receiving the synchronization request signal from the IR emitter of the HMD during the first time window.

8. The method of claim 1, further comprising:

emitting, via the IR emitter of the HMD, a pairing request signal to the IR sensor of the peripheral device, wherein the pairing request signal encodes a data frame including an identifier to be assigned to the peripheral device, and wherein the peripheral device is configured to store the identifier in on-board memory and activate the IR constellation as acknowledgement of receiving the pairing request signal from the IR emitter of the HMD.

9. The method of claim 1, further comprising:

recognizing IR light emitted from an unknown IR constellation in addition to IR light emitted from the IR constellation of the peripheral device in a composite image frame of the sequence of composite image frames;

based at least on recognizing the IR light emitted from the unknown IR constellation, emitting, via the IR emitter of the HMD, a mute signal to the IR sensor of the peripheral device, wherein the mute signal encodes a data frame that includes a mute command to deactivate the IR constellation during capture of a next odd image frame; and filtering the IR light emitted from the unknown IR constellation out of the next composite image frame and other subsequent composite image frames in the sequence of composite image frame.

10. A head-mounted device (HMD) comprising:

an infrared (IR) emitter;

an outward-facing camera;

a logic subsystem; and a storage subsystem holding instruction executable by the logic subsystem to:

emit, via the IR emitter, a synchronization request signal to an IR sensor of a peripheral device, wherein the peripheral device is configured to activate an IR constellation of IR emitters as acknowledgement of receiving the synchronization request signal;

capture an image via the outward-facing camera;

determine that the peripheral device is synchronized with the HMD based at least on recognizing the activated IR constellation of the peripheral device in the image;

based at least on determining that the peripheral device is synchronized with the HMD, initiate a peripheral device tracking image capture sequence including a plurality of alternating odd image frames and even image frames, wherein the peripheral device is configured to activate the IR constellation according to a repeating first time window corresponding to when the outward-facing camera captures odd image frames and deactivate the IR constellation during a repeating second time window corresponding to when the outward-facing camera captures even image frames; and generate a sequence of composite image frames by subtracting content in corresponding even image frames from content in corresponding odd image frames such that the sequence of composite image frames includes IR light emitted from the activated IR constellation without other interfering content.

11. The HMD of claim 10, wherein the storage subsystem holds instructions executable by the logic subsystem to:

track a position of the peripheral device relative to the HMD based at least on recognizing the IR light emitted from the activated IR constellation of the peripheral device in the sequence of composite image frames.

12. The HMD of claim 10, wherein the storage subsystem holds instructions executable by the logic subsystem to:

based at least on determining that the peripheral device is synchronized with the HMD, during each first time window and each second time window, emit, via the IR emitter of the HMD, a synchronization signal to the IR sensor of the peripheral device, wherein the synchronization signal encodes a data frame that includes an identifier corresponding to the peripheral device and a command to be performed by the peripheral device.

13. The HMD of claim 12, wherein the outward-facing camera is configured to capture each odd image frame subsequent to a corresponding synchronization signal being emitted via the IR emitter in each first time window and capture each even image frame subsequent to a corresponding synchronization signal being emitted via the IR emitter of the HMD in each second time window.

14. The HMD of claim 12, wherein the peripheral device is a first peripheral device held in a left hand of a user wearing the HMD, wherein the IR constellation is a first IR constellation, wherein the HMD is configured to track a second peripheral device held in a right hand of a user wearing the HMD, wherein the second peripheral device has a second IR constellation different than the first IR constellation, wherein the synchronization signal encodes a data frame including a bit indicating whether the peripheral device is a left-hand peripheral device held in the left hand of the user or a right-hand peripheral device held in the right hand of the user.

15. The HMD of claim 10, wherein the storage subsystem holds instructions executable by the logic subsystem to:

during each first time window, emit via the IR emitter, the synchronization request signal to the IR sensor of the peripheral device to maintain synchronization between the peripheral device and the HMD, and wherein the peripheral device is configured to activate the IR constellation as acknowledgement of receiving the synchronization request signal.

16. The HMD of claim 15, wherein the peripheral device is configured to activate the IR constellation temporarily according to a local timer of the peripheral device based at least on the IR sensor of the peripheral device not receiving the synchronization request signal from the IR emitter of the HMD during the first time window.

17. The HMD of claim 10, wherein the storage subsystem holds instructions executable by the logic subsystem to:

emit, via the IR emitter of the HMD, a pairing request signal to the IR sensor of the peripheral device, wherein the pairing request signal encodes a data frame including an identifier to be assigned to the peripheral device, and wherein the peripheral device is configured to store the identifier in on-board memory and activate the IR constellation as acknowledgement of receiving the identifier signal from the IR emitter of the HMD.

18. The HMD of claim 10, wherein the storage subsystem holds instructions executable by the logic subsystem to:

recognize IR light emitted from an unknown IR constellation in addition to IR light emitted from the IR constellation of the peripheral device in a composite image frame of the sequence of composite image frames;

based at least on recognizing the IR light emitted from the unknown IR constellation, emit, via the IR emitter of the HMD, a mute signal to the IR sensor of the peripheral device that includes a mute command to deactivate the IR constellation during capture of a next odd image frame; and filter the IR light emitted from the unknown IR constellation out of the next composite image frame and other subsequent composite image frames in the sequence of composite image frame.

19. The HMD of claim 10, further comprising:

an inertial measurement unit (IMU) configured to output a position signal indicating a position of the HMD; and wherein the storage subsystem holds instructions executable by the logic subsystem to:

for each odd and even image frame in the peripheral device tracking image capture sequence, receive from the IMU of the HMD, a corresponding position signal indicating a position of the HMD when the corresponding odd or even image frame is captured by the outward-facing camera, and wherein each composite image frame in the sequence of composite image frames is generated based at least on a change in position of the HMD between corresponding odd and even image frames that are used to generate the composite image.

20. A method of tracking a peripheral device performed by a head-mounted device (HMD), the method comprising:

emitting, via an IR emitter of the HMD, a pairing request signal to an IR sensor of the peripheral device, wherein the pairing request signal encodes a data frame including an identifier to be assigned to the peripheral device, and wherein the peripheral device is configured to store the identifier in on-board memory and activate an IR constellation of IR emitters as acknowledgement of receiving the pairing request signal from the IR emitter of the HMD;

capturing a first image via an outward-facing camera of the HMD;

determining that the peripheral device is paired with the HMD based at least on recognizing the activated IR constellation of the peripheral device in the first image;

based at least on determining that the peripheral device is paired with the HMD, emitting, via the IR emitter of the HMD, a synchronization request signal to the IR sensor of the peripheral device, wherein the peripheral device is configured to activate the IR constellation as acknowledgement of receiving the synchronization request signal;

capturing a second image via the outward-facing camera of the HMD;

determining that the peripheral device is synchronized with the HMD based at least on recognizing the activated IR constellation of the peripheral device in the second image;

based at least on determining that the peripheral device is synchronized with the HMD, initiating a peripheral device tracking image capture sequence including a plurality of alternating odd image frames and even image frames, wherein the peripheral device is configured to activate the IR constellation according to a repeating first time window corresponding to when the outward-facing camera of the HMD captures odd image frames and deactivate the IR constellation during a repeating second time window corresponding to when the outward-facing camera of the HMD captures even image frames; and generating a sequence of composite image frames by subtracting content in corresponding even image frames from content in corresponding odd image frames such that the sequence of composite image frames includes IR light emitted from the activated IR constellation without other interfering content.

* * * * *